United States Patent
Quach et al.

(10) Patent No.: US 10,156,144 B2
(45) Date of Patent: Dec. 18, 2018

(54) TURBINE AIRFOIL AND METHOD OF COOLING

(71) Applicant: United Technologies Corporation, Farmington, CT (US)

(72) Inventors: San Quach, East Hartford, CT (US); Steven Bruce Gautschi, Naugatuck, CT (US); Matthew A. Devore, Rocky Hill, CT (US); Scott D. Lewis, Vernon, CT (US); Matthew S. Gleiner, Norwalk, CT (US); Christopher King, Bristol, CT (US); Christopher Corcoran, Manchester, CT (US); David Donald Chapdelaine, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 296 days.

(21) Appl. No.: 14/871,456

(22) Filed: Sep. 30, 2015

(65) Prior Publication Data

US 2017/0089206 A1    Mar. 30, 2017

(51) Int. Cl.
*F01D 5/18* (2006.01)
*F01D 5/20* (2006.01)

(52) U.S. Cl.
CPC ............... *F01D 5/187* (2013.01); *F01D 5/20* (2013.01); *F01D 5/186* (2013.01); *F05D 2220/32* (2013.01); *F05D 2240/307* (2013.01); *F05D 2260/202* (2013.01); *Y02T 50/673* (2013.01); *Y02T 50/676* (2013.01)

(58) Field of Classification Search
CPC . F01D 5/187; F01D 5/186; F01D 5/20; F01D 5/147
See application file for complete search history.

(56) References Cited

U.S. PATENT DOCUMENTS

| | | | |
|---|---|---|---|
| 5,192,192 A * | 3/1993 | Ourhaan | F01D 5/18 415/115 |
| 7,704,045 B1 | 4/2010 | Liang | |
| 8,469,666 B1 | 6/2013 | Liang | |
| 2014/0030102 A1* | 1/2014 | Mishra | F01D 5/20 416/223 R |
| 2015/0118063 A1 | 4/2015 | Lewis et al. | |

OTHER PUBLICATIONS

European Search Report for Application No. Ep 16 18 2080.

* cited by examiner

*Primary Examiner* — Jason Shanske
*Assistant Examiner* — Sabbir Hasan
(74) *Attorney, Agent, or Firm* — Cantor Colburn LLP

(57) ABSTRACT

An airfoil for use in a gas turbine engine is provided. The airfoil having: a pressure surface and a suction surface each extending axially from a leading edge to a trailing edge of the airfoil, at least one of the pressure surface, the suction surface, the leading edge and the trailing edge terminating at an edge of a tip section of the airfoil; a plurality of internal cooling channels located within the airfoil; and at least one cooling hole in fluid communication with at least one of the plurality of internal cooling channels, wherein the at least one cooling hole is aligned with an opening or diffuser that extends directly from the at least one cooling hole and wherein the opening or diffuser is formed in and extends through the edge of the tip section of the airfoil.

19 Claims, 8 Drawing Sheets

TURBINE AIRFOIL AND METHOD OF COOLING

FEDERAL RESEARCH STATEMENT

This invention was made with government support under Contract No. N68335-13-C-0005 from the United States Navy. The government therefore has certain rights in this invention.

BACKGROUND

This disclosure relates to gas turbine engines, and more particularly to turbine rotor components. In particular, the present disclosure relates to turbine airfoils and methods of cooling turbine airfoils.

Turbine airfoils or outer air seals operate in an environment where the associated gas temperatures often exceed the capability of the materials of the airfoils and/or outer seals and therefore they require cooling features to protect against damage. Cooling air from a compressor of the engine is directed towards these surfaces and provides internal convection cooling inside the airfoils. One side effect of directing large amounts of cooling air towards these surfaces or components is that less gas then becomes available for work extraction and therefore, the overall engine efficiency may be reduced with higher amounts of cooling. In addition, blade tips are highly susceptible to erosion, oxidation, and thermal mechanical fatigue crack damage due to high thermal heat load. This damage reduces turbine efficiency by increasing cooling leakage air. As demands for higher thrust or efficiency increase, the airfoil design must accommodate for increasing turbine inlet temperatures and/or reduced cooling flow allocation.

Accordingly, it is desirable to provide turbine airfoils with improved cooling features and methods of cooling areas of the turbine airfoils.

BRIEF DESCRIPTION

In one embodiment, an airfoil for use in a gas turbine engine is provided. The airfoil having: a pressure surface and a suction surface each extending axially from a leading edge to a trailing edge of the airfoil, at least one of the pressure surface, the suction surface, the leading edge and the trailing edge terminating at an edge of a tip section of the airfoil; a plurality of internal cooling conduits located within the airfoil; and at least one cooling hole in fluid communication with at least one of the plurality of internal cooling conduits, wherein the at least one cooling hole is aligned with an opening that extends directly from the at least one cooling hole and wherein the opening is formed in and extends through the edge of the tip section of the airfoil.

In addition to one or more of the features described above, or as an alternative to any of the foregoing embodiments, further embodiments may include a squealer pocket formed in the tip section, wherein the opening is located in an interior peripheral wall of the squealer pocket.

In addition to one or more of the features described above, or as an alternative to any of the foregoing embodiments, the squealer pocket may form a closed radial recess in the tip section of airfoil.

In addition to one or more of the features described above, or as an alternative to any of the foregoing embodiments, the opening may be located in the leading edge of the airfoil.

In addition to one or more of the features described above, or as an alternative to any of the foregoing embodiments, further embodiments may include a plurality of cooling holes located on the leading edge of the airfoil, wherein the plurality of cooling holes are in fluid communication with the plurality of internal cooling conduits.

In addition to one or more of the features described above, or as an alternative to any of the foregoing embodiments, the plurality of cooling holes may be located in a trench.

In addition to one or more of the features described above, or as an alternative to any of the foregoing embodiments, the opening may be located in a tip shelf of the tip section of the airfoil.

In addition to one or more of the features described above, or as an alternative to any of the foregoing embodiments, the tip shelf may extend along the pressure surface between the leading edge and the trailing edge.

In addition to one or more of the features described above, or as an alternative to any of the foregoing embodiments, the tip shelf may extend along the pressure surface from the leading edge to the trailing edge.

In addition to one or more of the features described above, or as an alternative to any of the foregoing embodiments, the tip section may further comprise a squealer pocket.

In another embodiment, an airfoil for use in a gas turbine engine is provided. The airfoil having: a pressure surface and a suction surface each extending axially from a leading edge to a trailing edge of the airfoil, at least one of the pressure surface, the suction surface, the leading edge and the trailing edge terminating at an edge of a tip section of the airfoil; a plurality of internal cooling conduits located within the airfoil; and a plurality of cooling openings each being in fluid communication with at least one of the plurality of internal cooling conduits, wherein a portion of the plurality of cooling openings are each aligned with a corresponding opening of a plurality of openings that extend directly from the cooling opening and extend through the edge of the tip section, wherein the portion of the plurality of cooling openings is less than the plurality of cooling openings.

In addition to one or more of the features described above, or as an alternative to any of the foregoing embodiments, further embodiments may include a squealer pocket formed in the tip section, wherein the portion of the plurality of cooling openings are partially aligned with an interior peripheral wall of the squealer pocket.

In addition to one or more of the features described above, or as an alternative to any of the foregoing embodiments, further embodiments may include a tip shelf that extends along the pressure surface between the leading edge and the trailing edge and wherein another portion of the plurality of cooling openings are each aligned with an opening of a plurality of openings that extends directly from the cooling opening and wherein the plurality of openings are located in an edge portion of the tip shelf.

In addition to one or more of the features described above, or as an alternative to any of the foregoing embodiments, further embodiments may include a tip shelf that extends along the pressure surface between the leading edge and the trailing edge and wherein another portion of the plurality of cooling openings are each aligned with an opening of a plurality of openings that extend directly from the cooling opening and wherein the plurality of openings are located in an edge portion of the tip shelf.

In addition to one or more of the features described above, or as an alternative to any of the foregoing embodiments, wherein the squealer pocket forms a closed radial recess in the tip section of airfoil.

In addition to one or more of the features described above, or as an alternative to any of the foregoing embodiments, another portion of the plurality of cooling openings may be located in the leading edge of the airfoil.

In addition to one or more of the features described above, or as an alternative to any of the foregoing embodiments, another portion of the plurality of cooling openings may be located on the leading edge of the airfoil, wherein the another portion of the plurality of cooling openings located on the leading edge of the airfoil are in fluid communication with the plurality of internal cooling conduits.

In addition to one or more of the features described above, or as an alternative to any of the foregoing embodiments, the another portion of the plurality of cooling openings located on the leading edge of the airfoil may be located in a trench.

In yet another embodiment, a method for cooling a portion of a tip section of an airfoil configured for use in a gas turbine engine is provided. The method including the steps of: fluidly coupling at least one opening located in a portion of the tip section to a cooling opening in fluid communication with at least one of a plurality of internal cooling conduits located within the airfoil, wherein the at least one opening extends directly from the at least one cooling opening through an edge of the tip section of the airfoil.

In addition to one or more of the features described above, or as an alternative to any of the foregoing embodiments, the at least one opening may be located in any combination of: an interior peripheral wall of a squealer pocket, an edge of a tip shelf, a leading edge of the airfoil.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
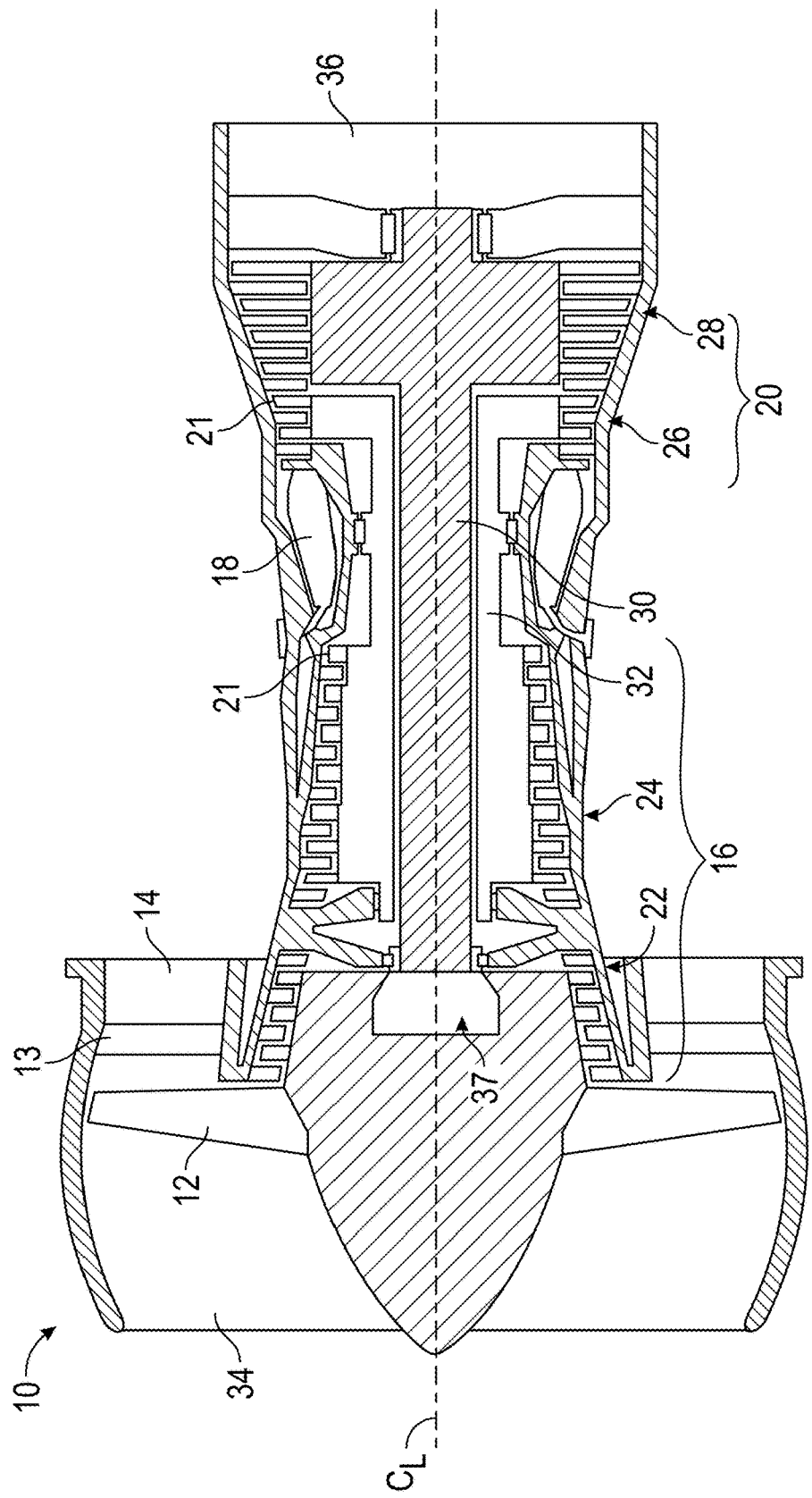
FIG. 1 is a cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to airfoils for gas turbine engines and methods for cooling the blade tips of the airfoils. Although engine airfoils are discussed herein, it is understood that embodiments of this disclosure may be applied on any turbomachinery component that requires cooling.

In accordance with various embodiments of this disclosure an airfoil with cooling holes or openings is provided. The cooling holes of the airfoil will break out of one, some, or all of the following edges: inner squealer pocket wall, intersection of pressure side and shelf, leading edge tip, outer squealer pocket wall on pressure or suction side, and/or intersection of tip with either suction or pressure side. In various embodiments, there will be at least one cooling hole breaking out of the edge arranged in any orientation with any type of exit diffuser or opening or diffuser opening such as cylindrical, shaped, multi-lobed, conical, slot, etc. In addition, the airfoil may have a squealer pocket and/or tip shelf of any size and aspect ratio along the tip chord.

One benefit of various embodiments disclosed herein is that blade erosion, oxidation, and thermal mechanical fatigue (TMF) life will be improved, resulting in improved life cycle maintenance costs for the original equipment manufacturer (OEM) as well as the customer. The position of the cooling hole breaking into the edge will add conduction cooling heat transfer and protect the edge from oxidation. This will protect the airfoil aerodynamic shape from thermal damage and improve turbine efficiency. Furthermore, by optimizing the cooling holes position and heat transfer, the required cooling flow may be compromised for more cycle efficiency for a given life.

Various embodiments of this disclosure may be applied on any turbomachinery component that requires cooling. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Turbofan engine performance depends on precise control of the working fluid flow, including flow across the airfoil tip. Where clearance, abrasion and temperature effects are of concern, moreover, these factors often pose competing design demands on compressor and turbine rotor geometry, particularly in the tip region of the airfoil.

Referring now to FIG. 1, a cross-sectional view of gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in at least one of the compressor section 16 and the turbine section 20 are provided with cooling hole configurations, for improved performance and reliability as will be described below.

In the two-spool, high bypass configuration of FIG. 1, compressor section 16 includes a low pressure compressor 22 and a high pressure compressor 24. The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool. High pressure compressor 24 is rotationally coupled to the high pressure turbine 26 via a high pressure shaft 32, forming the high pressure spool or high spool.

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, the low pressure shaft 30 may be coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

Figure 2:
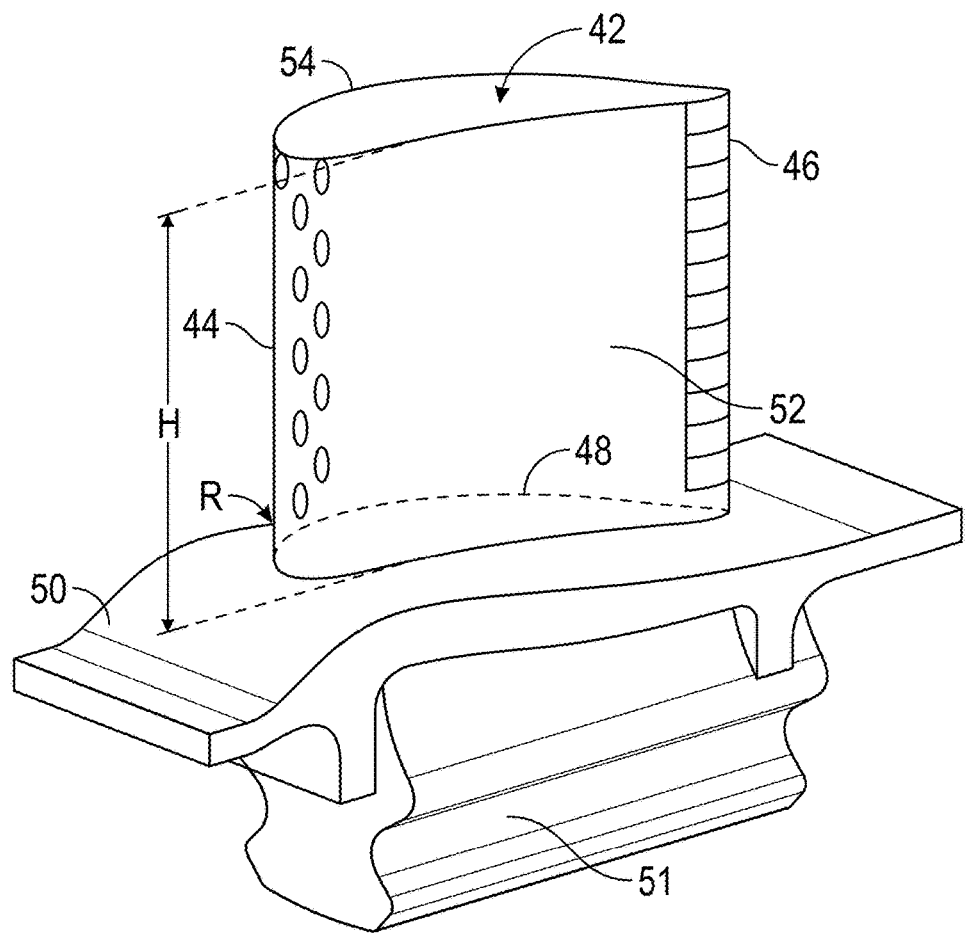
FIG. 2 is a perspective view of a rotor airfoil for the gas turbine engine.

FIG. 2 is a perspective view of rotor airfoil 21 for use in the gas turbine engine 10 of FIG. 1. The airfoil 21 has a tip section 42. The airfoil 21 when installed in the fan or compressor section of a gas turbine engine or other turbomachine extends axially from a leading edge 44 to a trailing edge 46, and radially from a root section 48, adjacent an inner diameter platform 50, to the tip section 42. The root section 48 typically has fillet radius R along leading edge 44, trailing edge 46 or both, forming a smooth aerodynamic and stress relief transition to platform 50 with attachment 51.

A pressure surface 52 (front) and suction surface 54 (back) extend axially from leading edge 44 to trailing edge 46, defining the profile of airfoil 21 therebetween. Pressure (generally concave) surface 52 and suction (generally convex) surface 54 extend radially from root section 48 and platform 50 to tip section 42, defining span height H of the airfoil 21.

When airfoil 21 is exposed to high temperature flow, for example in the turbine and high pressure compressor sections of a low-bypass turbofan for military applications, tip section 42 experiences oxidation, erosion, burn-through and other high temperature effects.

Figure 3:
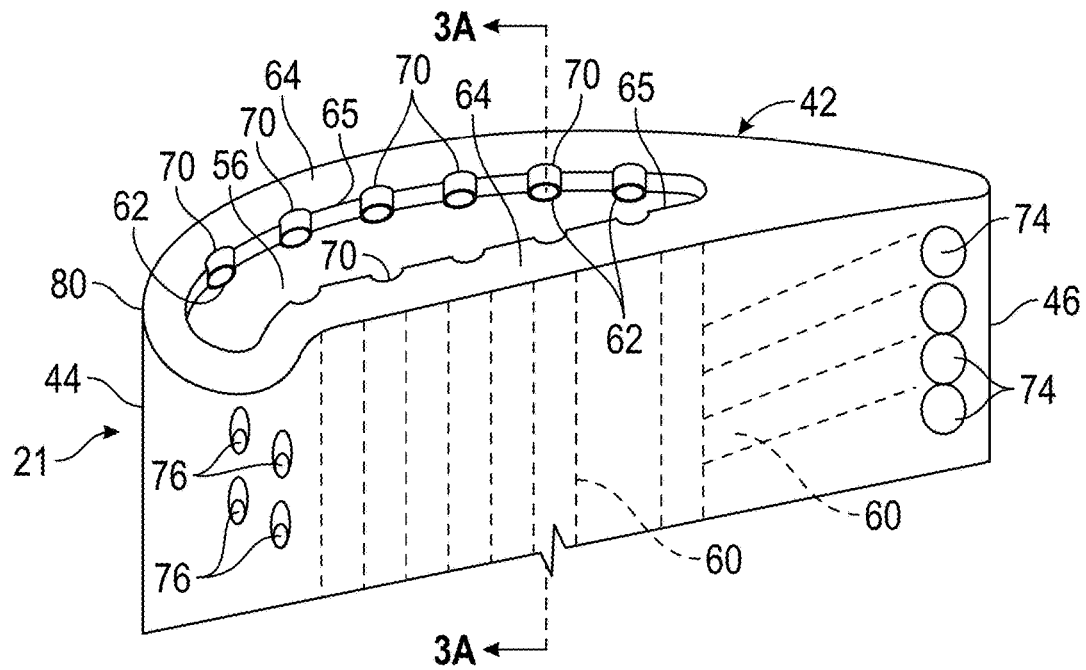
FIG. 3 is perspective view of a tip section of an airfoil in accordance with an embodiment of the disclosure.

To address this problem, tip section 42 of airfoil 21 is formed with unique cooling configurations as will be discussed herein. In some embodiments, break edges or edges located in the tip section 42 of the airfoil are configured to have unique cooling configurations that may include integrally formed channels or openings or diffuser openings in combination with cooling openings. As used herein one non-limited definition of edge or edges refers to the intersection of one surface with another surface that extends in a different direction. For example and referring now to FIG. 3, a portion of the tip section 42 located between the pressure surface 52 and the suction surface 54 has a squealer pocket 56, which in one embodiment forms a closed radial recess in tip section 42 of airfoil 21, extending axially between leading edge 44 and trailing edge 46 and between pressure surface 52 and suction surface 54.

The squealer tip cavity (or squealer pocket) 56 maintains a region or pocket of cooling fluid (e.g., air) along tip section 42 of airfoil 21, between pressure surface 52 and suction surface 54. Airfoil 21 also includes internal cooling channels or conduits 60 that are in fluid communication with a source of cooling air. Internal cooling channels or conduits 60 provide cooling fluid (e.g., air) flow to tip 42 via cooling holes or openings 62, and to squealer tip cavity 56. As illustrated, the cooling holes or openings 62 are located such that at least some of the cooling holes 62 are partially located within a wall 64 defining a periphery or inner periphery of the squealer pocket 56. As such, a channel or opening or diffuser opening or exit opening or exit diffuser opening 70 extends directly from cooling hole 62 through a portion of wall 64 to its edge 65. Non limiting configurations of the opening 70 or diffuser opening or exit diffuser extending directly from the cooling hole may include cylindrical, shaped, multi-lobed, conical, slot, channel, groove, etc. As used herein directly from cooling hole or opening is understood to describe a channel or opening or diffuser that extends directly from the opening or hole to and through an edge of the tip of the airfoil without any interference from material of the airfoil 21.

By locating the cooling holes or openings 62 in wall 64 such that channels or openings or diffuser openings 70 are formed therein, additional cooling benefits are provided. For example, channels or openings or diffuser openings or diffusers 70 allow cooling air to pass directly along or in a portion of wall 64 thereby maintaining wall 64 at a lower temperature during operation of the engine 10. This allows cooling air to directly pass along surfaces and edges of the tip section 42 that may have been passed over by the cooling air if the cooling hole or opening 62 was not at least partially located within wall 64 and its edge 65. Still further, channels or openings or diffuser openings or diffusers 70 remove additional material from the tip section 42 and/or wall 64 and its edge 65 and accordingly a lesser amount of material in the tip section 42 is required to be cooled. It is, of course, understood that cooling holes 62 and the associated channels or openings or diffuser openings or diffusers 70 illustrated in FIG. 3 may be used alone or in combination with any of the embodiments disclosed herein.

Figure 3A:
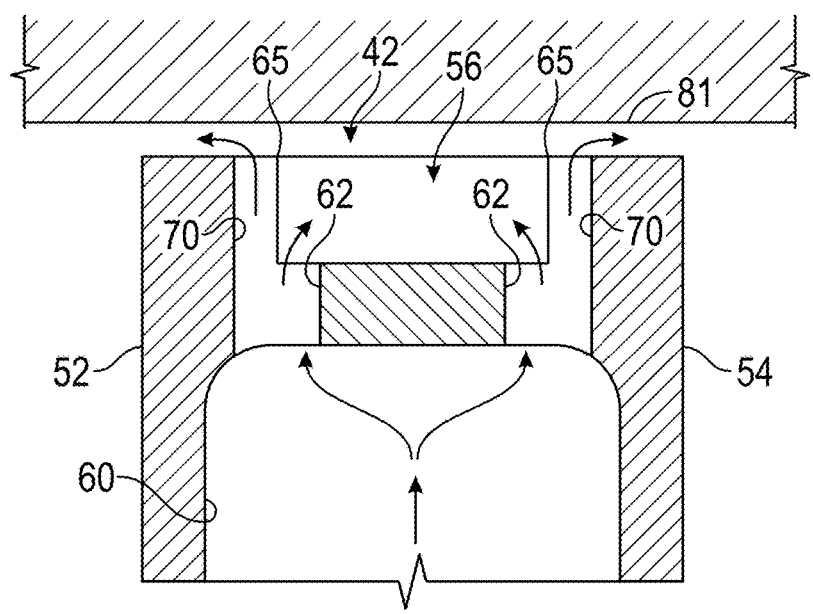
FIG. 3A is a view along lines 3A-3A of FIG. 3.

In addition and in some embodiments, internal cooling channels or conduits 60 may also provide additional cooling flow, for example to trailing edge cooling holes or cooling slots 74 along trailing edge 46 in order to improve heat transfer and flow properties along this region of the airfoil 21. FIG. 3A is a cross-section view illustrating the cooling air flow through the airfoil 21 via conduits 60, openings 62 and openings or diffusers 70 and across edge 65 in accordance with one non-limiting embodiment of the disclosure via the arrows in FIG. 3A. In FIG. 3A a portion of a blade outer air seal (BOAS) 81 is also illustrated. Still further, the leading edge 44 may be provided with cooling holes 76 that are in fluid communication with cooling channels or conduits 60 in order to improve heat transfer and flow properties along this region of the airfoil 21.

Figure 4:
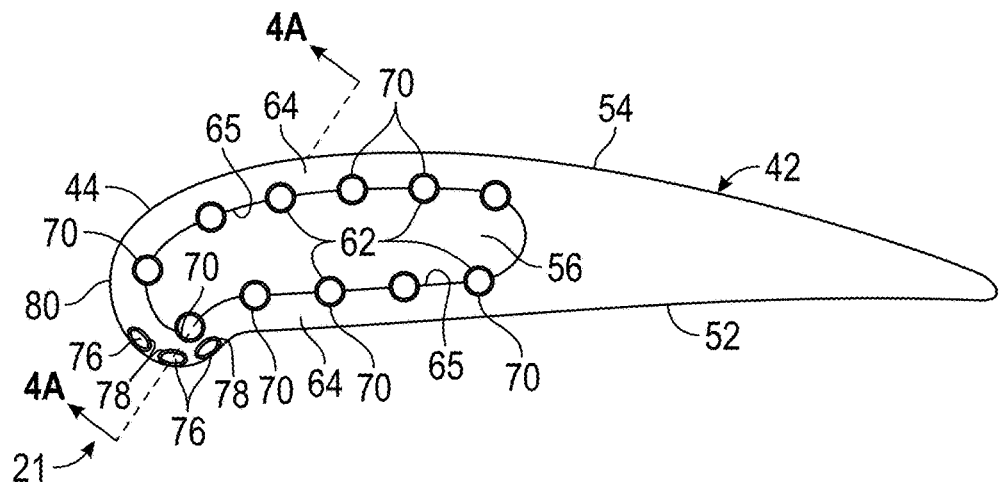
FIG. 4 is a top view of a tip section of an airfoil in accordance with an alternative embodiment of the disclosure.
Figure 4A:
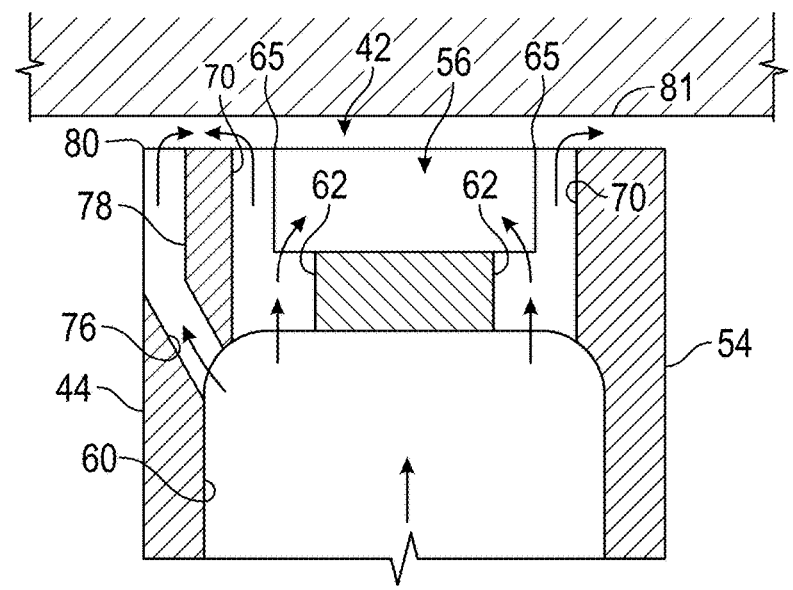
FIG. 4A is a view along lines 4A-4A of FIG. 4.
Figure 5:
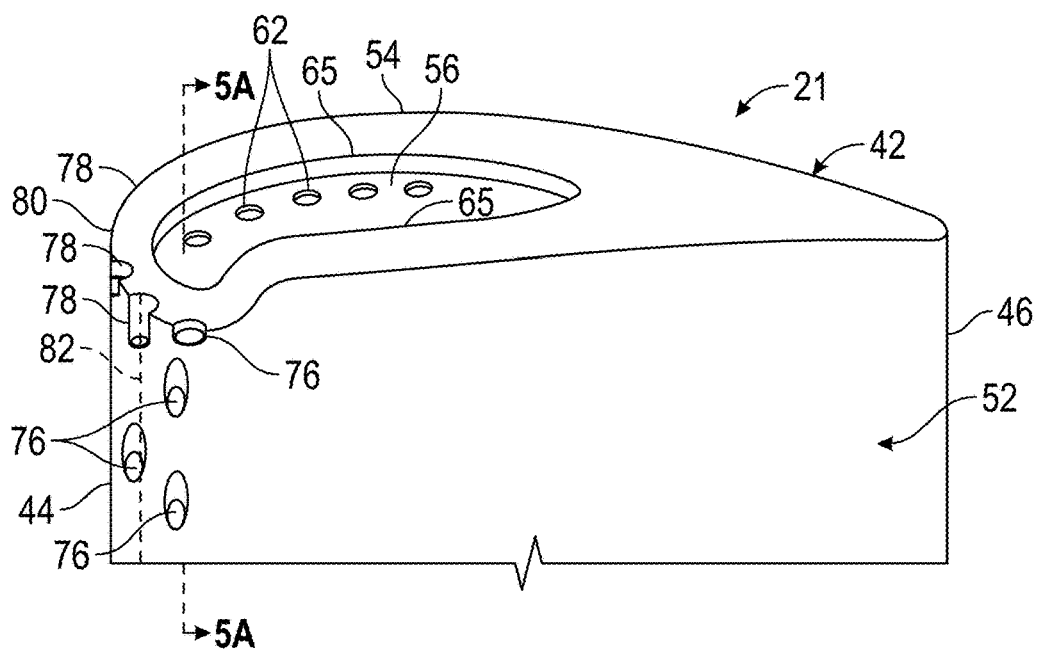
FIG. 5 is perspective view of a tip section of an airfoil in accordance with another alternative embodiment of the disclosure.
Figure 7:
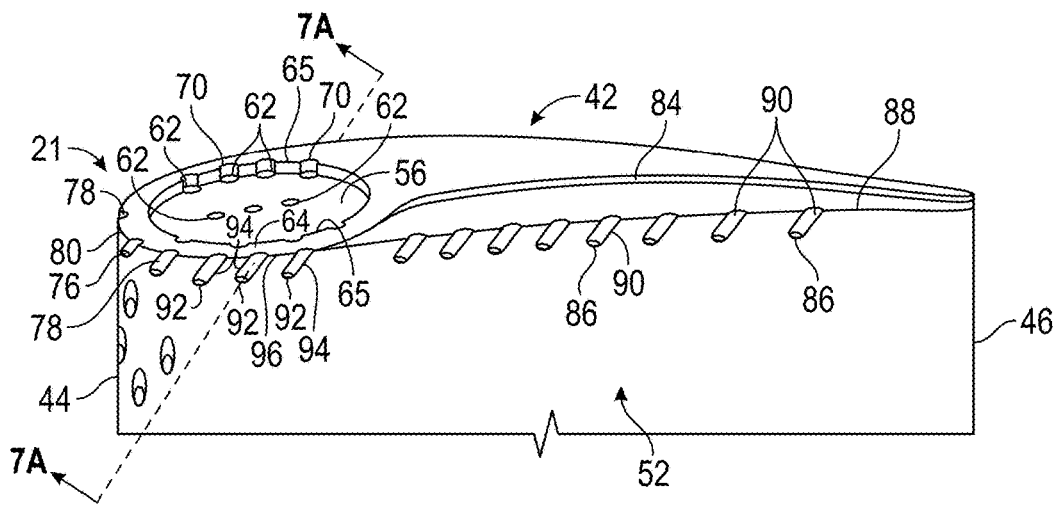
FIG. 7 is perspective view of a tip section of an airfoil in accordance with still another alternative embodiment of the disclosure.

Referring now to at least FIG. 4, at least some of the cooling holes or openings 76 located proximate to the tip section 42 and may have channels or openings or diffuser openings or diffusers 78 that extend through a leading edge 80 of tip section 42 (See also FIGS. 5 and 7). As mentioned above, the channels or openings or diffuser openings or diffusers 78 provide additional cooling benefits. For example, channels or openings or diffuser openings or diffusers 78 extend directly from opening 76 to allow cooling air to pass directly along or in a portion of edge 80 thereby maintaining this portion of the airfoil at a lower temperature during operation of the engine 10. Still further, channels 78 remove additional material from the tip section 42 and in particular edge 80 and accordingly a lesser amount of material in the tip section 42 is required to be cooled. FIG. 4A is a cross-section view illustrating the cooling air flow through the airfoil 21 via conduits 60, openings 62, 76 and openings or diffusers 70, 78 and across edges 65, 85 in accordance with one non-limiting embodiment of the disclosure via the arrows in FIG. 4A. In FIG. 4A a portion of a blade outer air seal (BOAS) 81 is also illustrated. It is, of course, understood that cooling holes 76 with or without the associated channels or openings or diffuser openings or diffusers 78 illustrated in at least FIG. 4 may be used alone or in combination with any of the embodiments disclosed herein.

Figure 5A:
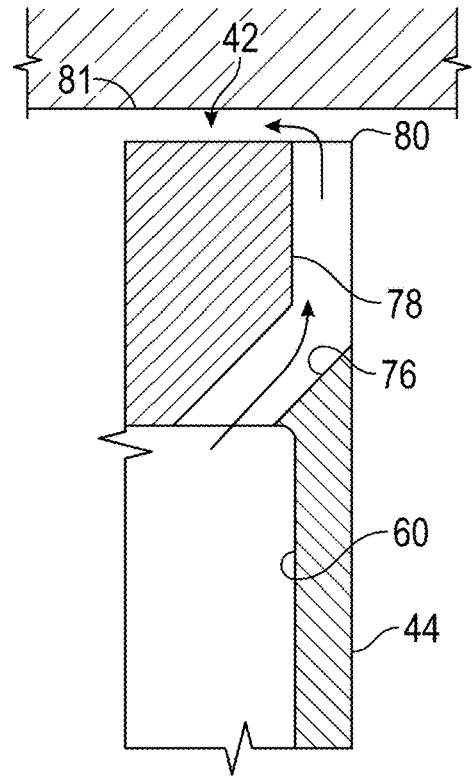
FIG. 5A is a view along lines 5A-5A of FIG. 5.

For example, FIG. 5 illustrates an airfoil 21 with a squealer pocket 56 and wherein the cooling holes 62 are not located in wall 64 however, some of the holes or openings 76 are located in the leading edge 80 such that channels 78 are formed. In yet another alternative embodiment, the leading edge 44 may be configured to have a recessed area or trench 82 (illustrated by the dashed lines in FIG. 5) that extends along a portion or the entire edge 44. FIG. 5A is a cross-section view illustrating the cooling air flow through the airfoil 21, conduits 60, openings 76 and openings or diffusers 78 and across edge 80 in accordance with one non-limiting embodiment via the arrows in FIG. 5A. In FIG. 5A a portion of a blade outer air seal (BOAS) 81 is also illustrated. In this embodiment some or all of the cooling holes 76 may be located in recessed area or trench 82. It is, of course, understood that configurations illustrated in FIG. 5 may be used alone or in combination with any of the embodiments disclosed herein.

Figure 6:
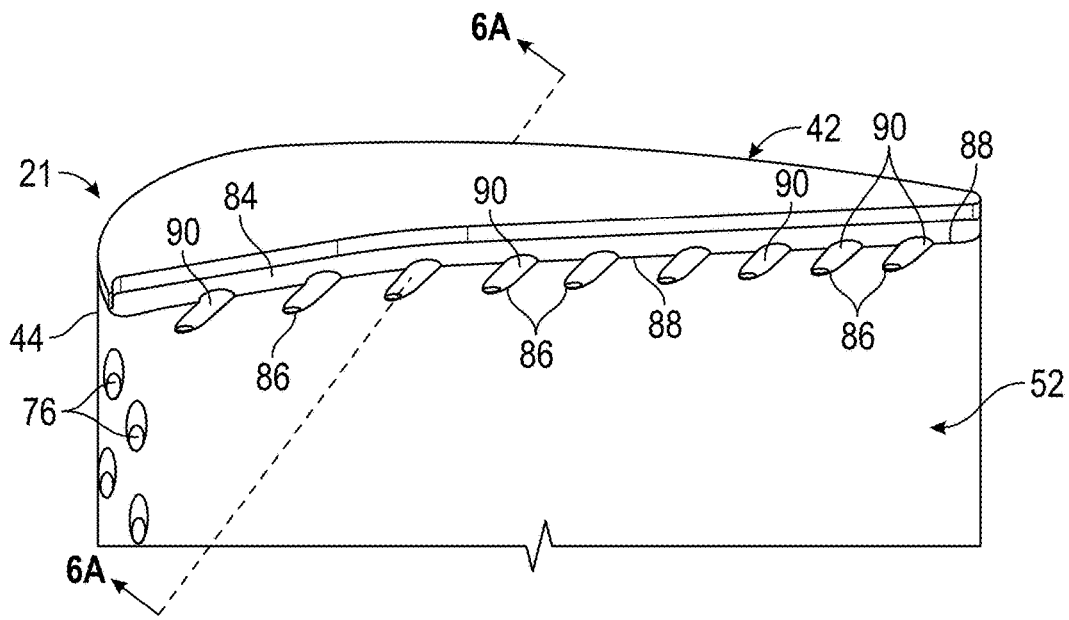
FIG. 6 is perspective view of a tip section of an airfoil in accordance with yet another alternative embodiment of the disclosure.

Referring now to FIG. 6 yet another alternative embodiment of the disclosure is illustrated. In this embodiment, the airfoil 21 is configured to have a tip shelf 84. Tip shelf 84 provides a surface or plateau between pressure surface 52 and the top the tip section 42. Tip shelf 84 maintains a region or pocket of cooling fluid along pressure surface 52, between leading edge 44 and trailing edge 46, in tip section 42. The pockets of cooling fluid may provide a more uniform cooling temperature along tip section 42, for better oxidation resistance, reduced erosion and less burn-through as mentioned above.

Figure 6A:
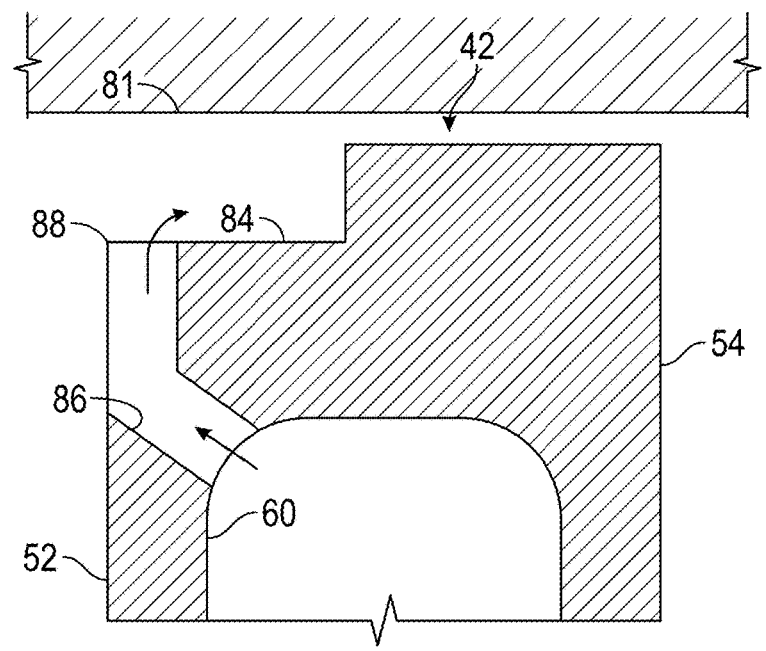
FIG. 6A is a view along lines 6A-6A of FIG. 6.

Here the tip shelf 84 has a plurality of cooling holes or openings 86 that are in fluid communication with channels or conduits 60 such that cooling fluid may be applied along tip shelf 84. In this embodiment, the openings 86 are configured to extend through an edge 88 of tip shelf 84 such that an associated channel or diffuser 90 extends directly from and is aligned with opening 86. As mentioned above, the channels 90 allow cooling air to pass directly along or in a portion of edge 88 thereby maintaining this portion of the airfoil 21 at a lower temperature during operation of the engine 10. Still further, channels or diffusers 90 remove additional material from the tip section 42 and accordingly a lesser amount of material in the tip section 42 is required to be cooled. Also shown is that the cooling channels 90 may be angularly orientated with respect to edge 88. Of course, numerous angular orientations are considered to be with the scope of various embodiments of the disclosure. FIG. 6A is a cross-section view illustrating the cooling air flow through the airfoil 21 via conduits 60, openings 86 and openings or diffusers 90 and across edge 88 of tip shelf 84 in accordance with one non-limiting embodiment of the disclosure via the arrows in FIG. 6A. In FIG. 6A a portion of a blade outer air seal (BOAS) 81 is also illustrated. It is, of course, understood that cooling holes 86 and the associated channels or openings or diffuser openings 90 illustrated in FIG. 6 may be used alone or in combination with any of the embodiments disclosed herein.

Figure 7A:
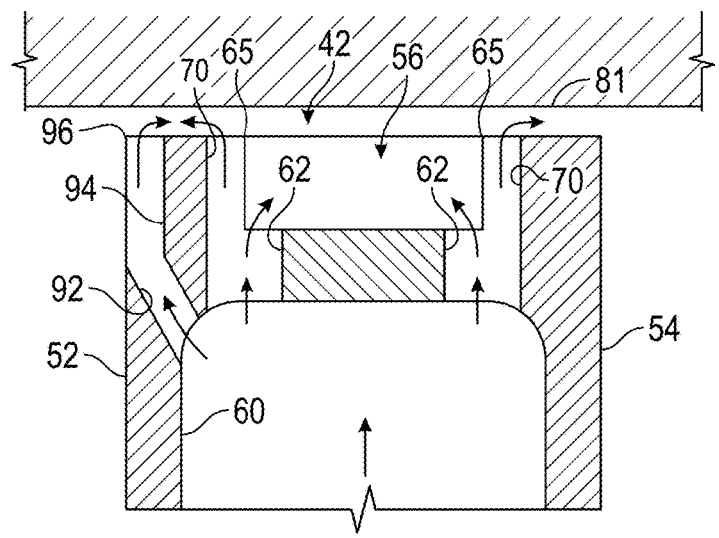
FIG. 7A is a view along lines 7A-7A of FIG. 3.

Referring now to FIG. 7, yet another alternative embodiment of the disclosure is illustrated. In this embodiment, the airfoil 21 is configured to have a both a squealer pocket 56 and a tip shelf 84. In this embodiment, the tip shelf 84 only extends along a portion of the surface between leading edge 44 and trailing edge 46 in tip section 42. Here the tip section 42 has cooling openings 86 and associated channels or openings or diffuser openings or diffussers 90 as well as cooling openings 62 and associated channels or openings or diffuser openings or diffusers 70 and cooling openings 76 and associated channels or openings or diffuser openings or diffusers 78. In addition, openings 92 and associated channels or openings or diffuser openings or diffusers 94 extend through an outer edge 96 of wall 64. Still further the squealer pocket 56 also has openings 62 located in the surface of the pocket 56 and the leading edge 44 may have openings 76 that may or may not be located in a trench or recessed area 82. FIG. 7A is a cross-section view illustrating the cooling air flow through the airfoil 21 via conduits 60, openings 62, 92 and openings or diffusers 70, 94 and across edges 65, 96 in accordance with one non-limiting embodiment of the disclosure via the arrows in FIG. 7A. In FIG. 7A a portion of a blade outer air seal (BOAS) 81 is also illustrated. It is, of course, understood that cooling holes and associated channels or openings or diffuser openings or diffusers illustrated in FIG. 7 may be used alone or in combination with any of the embodiments disclosed herein.

Figure 8:
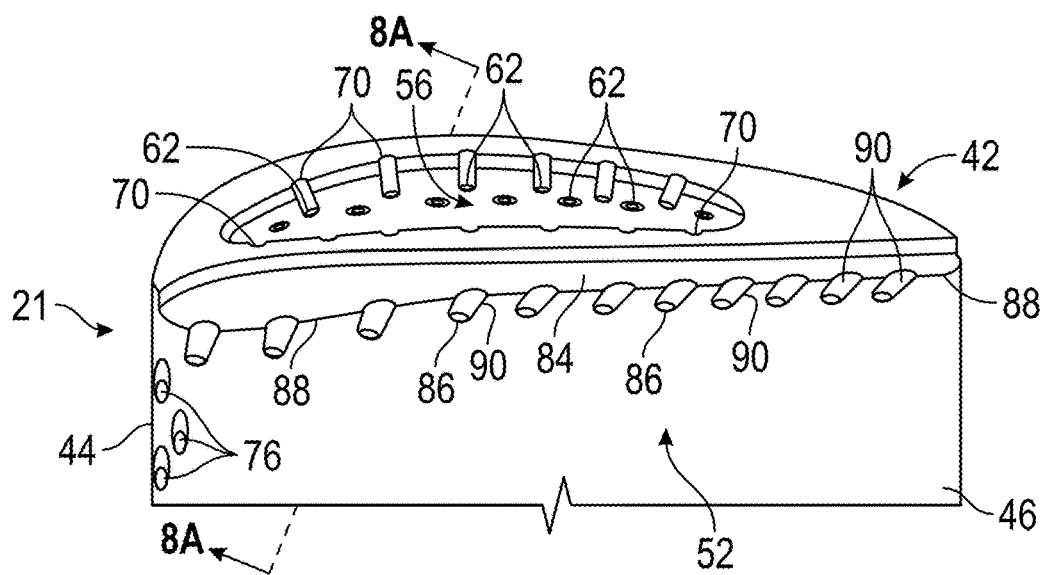
FIG. 8 is perspective view of a tip section of an airfoil in accordance with yet another alternative embodiment of the disclosure.
Figure 8A:
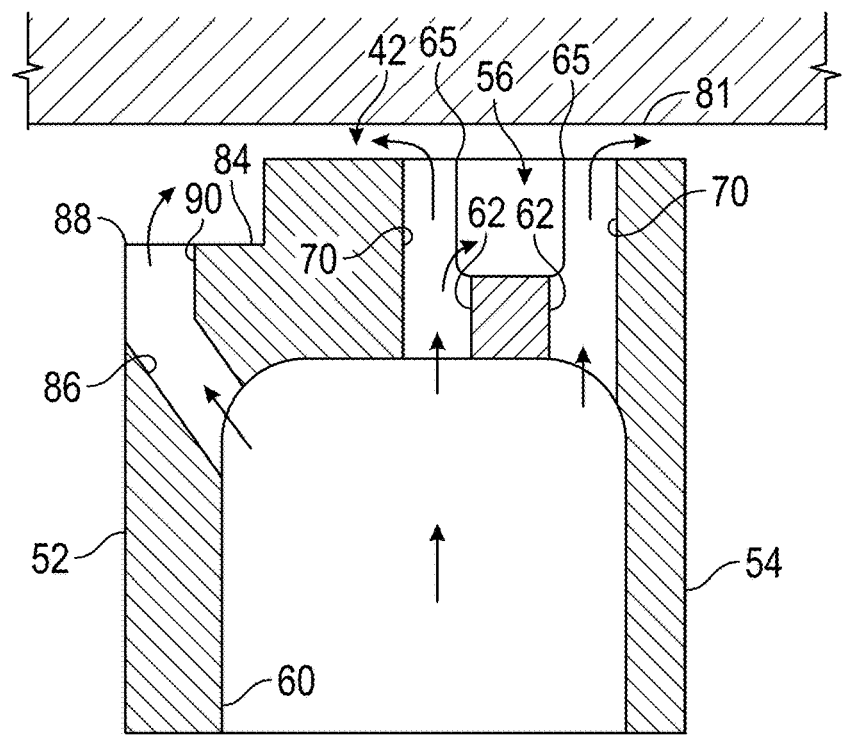
FIG. 8A is a view along lines 8A-8A of FIG. 8.

Referring now to FIG. 8 yet another alternative embodiment of the disclosure is illustrated. In this embodiment, the airfoil 21 is configured to have a both a squealer pocket 56 and the tip shelf 84 extends completely across from the leading edge 44 to the trailing edge 46. FIG. 8A is a cross-section view illustrating the cooling air flow through the airfoil 21 via conduits 60, openings 62, 86 and openings or diffusers 70, 90 and across edges 65, 88 in accordance with one non-limiting embodiment of the disclosure via the arrows in FIG. 8A. In FIG. 8A a portion of a blade outer air seal (BOAS) 81 is also illustrated. It is, of course, understood that cooling holes or openings and associated channels or openings or diffuser openings or diffusers illustrated in FIG. 8 may be used alone or in combination with any of the embodiments disclosed herein.

Any of the above mentioned configurations and combinations thereof reduce the film temperature across the tip section 42 its associated edges 65, 80, 88 and 96, which reduces the net heat flux into airfoil tip region 42, improving the performance and service life of airfoil 21. In addition, transient thermal strains are reduced due to the removal of hot metal volume with the incorporation of numerous channels associated with cooling openings.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An airfoil for use in a gas turbine engine, the airfoil comprising:
   a pressure surface and a suction surface each extending axially from a leading edge to a trailing edge of the airfoil, at least one of the pressure surface, the suction surface, the leading edge and the trailing edge terminating at an edge of a tip section of the airfoil;
   a plurality of internal cooling conduits located within the airfoil; and
   at least one cooling hole in fluid communication with at least one of the plurality of internal cooling conduits, wherein the at least one cooling hole is aligned with at least one opening that extends directly from the at least one cooling hole and wherein the opening is formed in and extends through an edge of a tip shelf of the tip section of the airfoil, wherein the edge of the tip shelf intersects the pressure surface.

2. The airfoil as in claim 1, further comprising a squealer pocket formed in the tip section, wherein the at least one cooling hole is a plurality of cooling holes, and wherein the at least one opening is a plurality of openings and each of the plurality of cooling holes are aligned with a respective one of the plurality of openings, wherein one of the plurality of cooling holes is located in an interior peripheral wall of the squealer pocket.

3. The airfoil as in claim 2, wherein the squealer pocket forms a closed radial recess in the tip section of airfoil.

4. The airfoil as in claim 1, wherein the at least one cooling hole is a plurality of cooling holes, and wherein the at least one opening is a plurality of openings and each of the plurality of cooling holes are aligned with a respective one of the plurality of openings, wherein one of the plurality of cooling holes is located in the leading edge of the airfoil.

5. The airfoil as in claim 1, further comprising a first plurality of cooling holes located on the leading edge of the airfoil, wherein the first plurality of cooling holes are in fluid communication with the plurality of internal cooling conduits.

6. The airfoil as in claim 5, wherein the first plurality of cooling holes are located in a trench.

7. The airfoil as in claim 1, wherein the tip shelf extends along the pressure surface between the leading edge and the trailing edge.

8. The airfoil as in claim 1, wherein the tip shelf extends along the pressure surface from the leading edge to the trailing edge.

9. The airfoil as in claim 1, wherein the tip section further comprises a squealer pocket.

10. An airfoil for use in a gas turbine engine, the airfoil comprising:
    a pressure surface and a suction surface each extending axially from a leading edge to a trailing edge of the airfoil, at least one of the pressure surface, the suction surface, the leading edge and the trailing edge terminating at an edge of a tip section of the airfoil;
    a plurality of internal cooling conduits located within the airfoil; and
    a plurality of cooling openings each being in fluid communication with at least one of the plurality of internal cooling conduits, wherein a portion of the plurality of cooling openings are each aligned with a corresponding opening of a plurality of openings that extend directly from the cooling opening and extend through an edge of a tip shelf of the tip section, wherein the edge of the tip shelf intersects the pressure surface.

11. The airfoil as in claim 10, further comprising a squealer pocket formed in the tip section, wherein some of the portion of the plurality of cooling openings are partially aligned with an interior peripheral wall of the squealer pocket.

12. The airfoil as in claim 11, wherein the tip shelf extends along the pressure surface between the leading edge and the trailing edge.

13. The airfoil as in claim 10, wherein the tip shelf extends along the pressure surface between the leading edge and the trailing edge.

14. The airfoil as in claim 11, wherein the squealer pocket forms a closed radial recess in the tip section of airfoil.

15. The airfoil as in claim 11, wherein another portion of the plurality of cooling openings are located in the leading edge of the airfoil.

16. The airfoil as in claim 11, wherein another portion of the plurality of cooling openings are located on the leading edge of the airfoil, wherein the another portion of the plurality of cooling openings located on the leading edge of the airfoil are in fluid communication with the plurality of internal cooling conduits.

17. The airfoil as in claim 16, wherein the another portion of the plurality of cooling openings located on the leading edge of the airfoil are located in a trench.

18. A method for cooling a portion of a tip section of an airfoil configured for use in a gas turbine engine the airfoil comprising: a pressure surface and a suction surface each extending axially from a leading edge to a trailing edge of the airfoil, at least one of the pressure surface, the suction surface, the leading edge and the trailing edge terminating at an edge of a tip section of the airfoil, the method comprising:

fluidly coupling at least one opening located in a portion of the tip section of the airfoil to a cooling opening in fluid communication with at least one of a plurality of internal cooling conduits located within the airfoil, wherein the at least one opening extends directly from the at least one cooling opening through an edge of a tip shelf of the tip section of the airfoil, wherein the edge of the tip shelf intersects the pressure surface.

19. The method as in claim 18, wherein the at least one opening is a plurality of openings located in any combination of: an interior peripheral wall of a squealer pocket, the edge of the tip shelf, and a leading edge of the airfoil.

* * * * *